United States Patent

Jachimowicz

[11] Patent Number: 5,821,911
[45] Date of Patent: Oct. 13, 1998

[54] MINIATURE VIRTUAL IMAGE COLOR DISPLAY

[75] Inventor: Karen E. Jachimowicz, Laveen, Ariz.

[73] Assignee: Motorola, Schaumburg, Ill.

[21] Appl. No.: 371,674

[22] Filed: Jan. 12, 1995

Related U.S. Application Data

[63] Continuation of Ser. No. 116,836, Sep. 7, 1993, abandoned.

[51] Int. Cl.$^6$ ....................................................... G09G 5/00
[52] U.S. Cl. .................................. 345/7; 345/32; 345/83; 359/638; 385/901
[58] Field of Search ............................. 345/1, 5, 7–9.32, 345/82, 83, 87, 88; 379/61; 358/88, 85, 224, 241; 340/825.44; 348/801, 802; 359/13, 14, 24, 629, 638; 385/119, 901

[56] References Cited

U.S. PATENT DOCUMENTS

| | | | |
|---|---|---|---|
| 4,481,382 | 11/1984 | Villa-Real | 379/61 |
| 4,485,377 | 11/1984 | Claus et al. | 345/82 |
| 4,711,512 | 12/1987 | Upatnieks | 345/7 |
| 4,853,764 | 8/1989 | Sutter | 358/88 |
| 4,934,773 | 6/1990 | Becker | 345/8 |
| 4,991,935 | 2/1991 | Sakurai | 345/87 |
| 5,003,300 | 3/1991 | Wells | 345/8 |
| 5,023,905 | 6/1991 | Wells et al. | 340/825.44 |
| 5,034,809 | 7/1991 | Katoh | 358/88 |
| 5,048,077 | 9/1991 | Wells et al. | 358/85 |
| 5,051,738 | 9/1991 | Tanielian et al. | 345/82 |
| 5,065,423 | 11/1991 | Gaskill | 340/825.44 |
| 5,079,636 | 1/1992 | Brody | 358/241 |
| 5,155,615 | 10/1992 | Tagawa | 345/9 |
| 5,184,114 | 2/1993 | Brown | 345/83 |
| 5,185,712 | 2/1993 | Sato et al. | 358/224 |
| 5,300,942 | 4/1994 | Dolgoff | 345/32 |

*Primary Examiner*—Steven Saras
*Attorney, Agent, or Firm*—Eugene A. Parsons

[57] ABSTRACT

A miniature virtual image color display having a viewing aperture, the display including a plurality of semiconductor chips each defining a plurality of pixels. The plurality of pixels of each semiconductor chip form a complete real image and each semiconductor chip is formed to provide the complete real image in a different color. An optical system combines the different colored real images and produces, from the plurality of complete real images, a single virtual image in color. The single virtual image is magnified so as to be viewable through the viewing aperture. The miniature virtual image display is designed to be incorporated into a communications receiver, such as a pager or two-way radio.

11 Claims, 5 Drawing Sheets

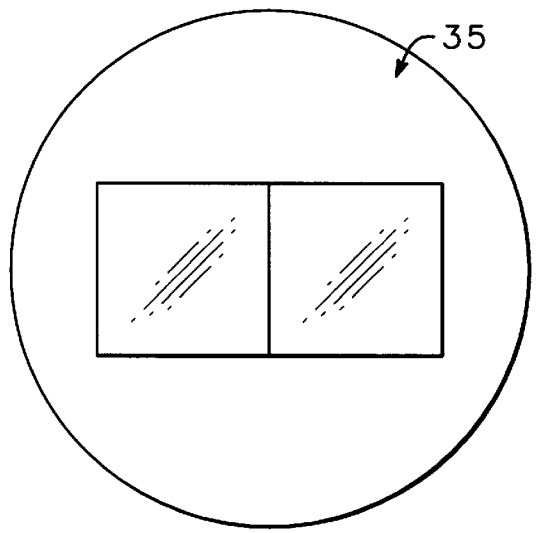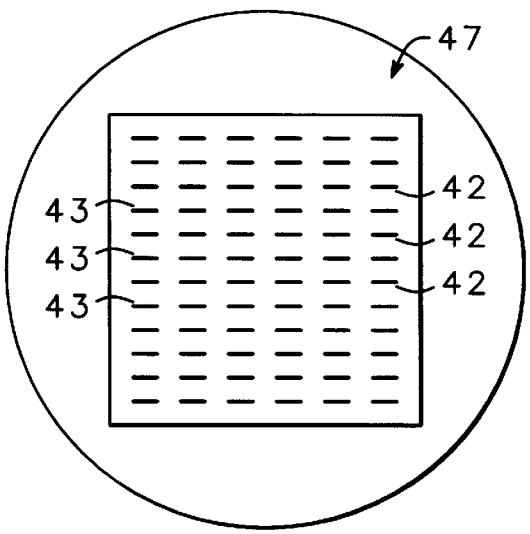
FIG. 5  FIG. 7
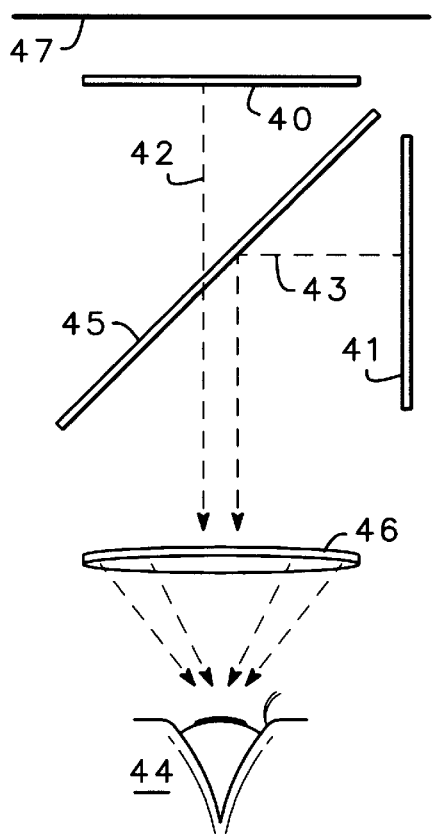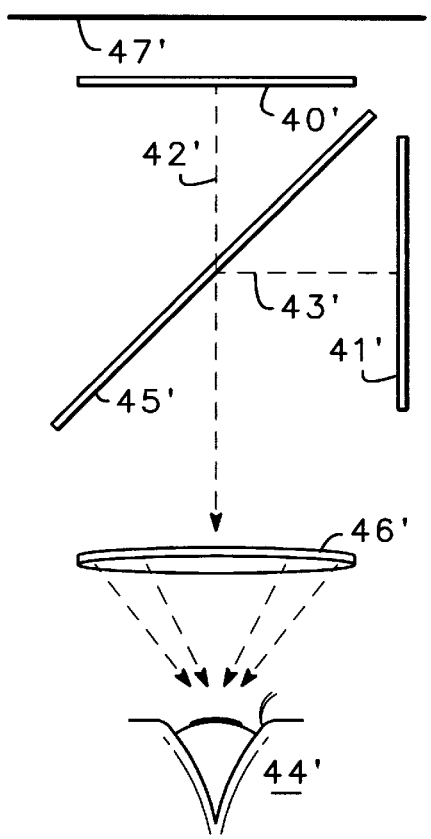
FIG. 6  FIG. 8

MINIATURE VIRTUAL IMAGE COLOR DISPLAY

This application is a continuation of prior application Ser. No. 08/116,836, filed Sep. 7, 1993, now abandoned.

FIELD OF THE INVENTION

The present invention pertains to visual displays and more specifically to miniature color visual displays.

BACKGROUND OF THE INVENTION

Miniature visual displays are becoming increasingly popular and especially in portable communications receivers, such as radios, cellular and cordless telephones, pagers and the like. In many instances it is desirable to provide a visual display on the receiver to supply the operator with a visual message. However, one problem is that standard visual displays require relatively high electrical power and require a great amount of area to be sufficiently large to produce a useful display.

In the prior art, for example, it is common to provide visual displays utilizing liquid crystal displays, directly viewed light emitting diodes, etc. These produce very large and cumbersome displays that greatly increase the size of the receiver and require relatively large amounts of power. In one instance, the prior art includes a scanning mirror to produce a visual display but again this requires relatively large amounts of power and is very complicated. Further, because the vibrating mirror is very sensitive to shock, this is not a convenient device to utilize in portable equipment. Also, the scanning mirror causes vibration in the unit which substantially reduces visual comfort and acceptability.

The single advantage in liquid crystal displays is the fact that color can be relatively easily produced. In some very large directly viewed light emitting diode displays color can also be incorporated. It is generally understood that the terms "color display" or "displays in color" refer to an image which includes multiple colors so as to appear as natural as possible or practical. The term "complete real image in color" is used in the following description to indicate such a multiple color image. The problem in the above prior art displays is that these displays are still very large, require relatively large amounts of power and, therefore, can not be conveniently incorporated into small and/or portable electronic and communication equipment. Clearly, a miniature color display that can be used in portable electronic and communication receivers is highly desirable.

One novel solution to these problems, which was recently disclosed in a copending application entitled "RECEIVER WITH MINIATURE VIRTUAL IMAGE DISPLAY", Ser. No. 07/767,178, filed on Sep. 30, 1991 and assigned to the same assignee, is to form an entire, or complete, real image on a single semiconductor chip. This solution works very well except that as the size of the displays increases, i.e., the number of pixels in the array increases, the cost and yield of the semiconductor chip are adversely affected. Further, creating multi-color light emission from a single semicondutor chip is complicated and costly at the present time.

Accordingly, it is a purpose of the present invention to provide a new and improved miniature virtual image color display which is easily incorporated into portable communication receivers and other electronic devices.

It is another purpose of the present invention to provide a new and improved miniature virtual image color display which is relatively inexpensive and simple to manufacture.

It is a further purpose of the present invention to provide a new and improved miniature virtual image color display for use with portable communication receivers and the like which substantially reduces the amount of power required and is substantially insensitive to shock.

It is a still further purpose of the present invention to provide a new and improved miniature virtual image color display for use in portable communication receivers and the like, which display requires substantially less space to provide a useful and easily viewable display.

It is another purpose of the present invention to provide a new and improved method of combining multi-colored images to produce a miniature virtual color image easily adapted for use in portable communication receivers and the like.

SUMMARY OF THE INVENTION

The above problems and others are at least partially solved and the above purposes and others are realized in a miniature virtual image color display having a viewing aperture. The display includes a plurality of semiconductor chips each defining a plurality of pixels forming a complete real image and each semiconductor chip is formed to provide the complete real image in a color different from the others. The display further includes an optical system for producing, from the plurality of complete real images, a single virtual image in color and magnified so as to be viewable through the viewing aperture.

The above problems and others are at least partially solved and the above purposes and others are further realized in a method of generating a miniature virtual image in color in a viewing aperture. The method includes providing a plurality of semiconductor chips each defining a plurality of pixels forming a complete real image and each semiconductor chip is formed to provide the complete real image in a color different from the others. All of the complete real images formed by each of the plurality of semiconductor chips are combined in simultaneous overlying relationship to produce a single image in color. The single image is magnified to produce a single virtual image in color, magnified sufficiently to be viewable through the viewing aperture.

BRIEF DESCRIPTION OF THE DRAWINGS

Referring to the drawings:

FIG. 5 is a representation of the virtual image seen in FIG. 4;

FIG. 6 is a schematic illustration of another image combining structure, for optically combining real images and providing a magnified virtual image;

FIG. 7 is a representation of the virtual image seen in FIG. 6;

FIG. 8 is a schematic illustration of another image combining structure, for optically combining real images and providing a magnified virtual image;

DESCRIPTION OF PREFERRED EMBODIMENTS

Figure 1:
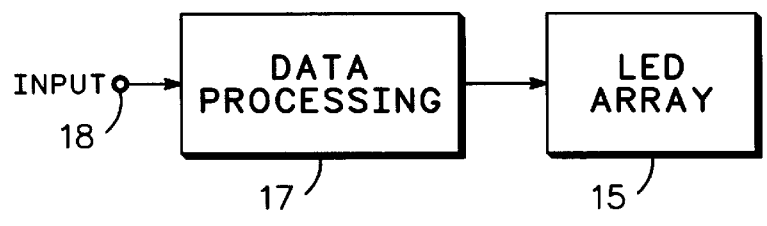
FIG. 1 is a simplified block diagram of electronics associated with a miniature virtual image display.

Referring specifically to FIG. 1, a simplified block diagram of apparatus 10 utilized to generate a complete real image is illustrated. Apparatus 10 includes, for example, semiconductor electronics such as a light emitting diode (LED) array 15 driven by data processing circuits 17. Data processing circuits 17 include, for example, logic and switching circuit arrays for controlling each LED in LED array 15. Data processing circuits 17 include, in addition to or instead of the logic and switching arrays, a microprocessor or similar circuitry for processing input signals to produce a desired real image on a device such as LED array 15. While the simplified block diagram of FIG. 1 illustrates light generating device array 15 separate from data processing electronics 17, it should be noted that all of this circuitry can be formed on a single semiconductor chip in some specific applications.

Figure 2:
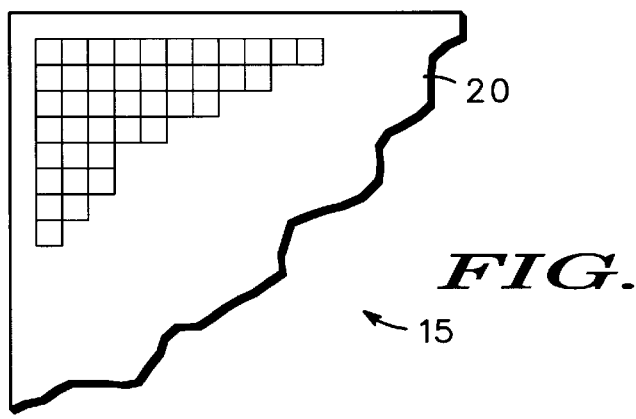
FIG. 2 is an enlarged view in top plan of an LED array, portions thereof broken away, forming a portion of the electronics of FIG. 1.

In this specific embodiment LED array 15 is utilized because of the extremely small size that can be achieved and because of the simplicity of construction and operation. It will of course be understood that other image generating devices may be utilized, including but not limited to lasers, field emission devices, organic LEDs, etc. Referring specifically to FIG. 2, a plan view of LED array 15 is illustrated in which pixels are formed in a regular pattern of rows and columns on a single semiconductor chip 20. Each pixel includes at least one LED, with additional parallel LEDs being included, if desired, for additional brightness and redundancy. By addressing specific pixels by row and column in a well known manner, the specific pixels are energized to produce a complete real image. Digital or analog data is received at input terminal 18 and converted by data processing circuits 17 into signals capable of energizing selected pixels to generate the predetermined complete real image.

It will be understood by those skilled in the art that LED array 15 and semiconductor chip 20 are greatly enlarged in FIGS. 1 and 2. The actual size of semiconductor chip 20 is on the order of a few milli-meters along each side with each LED being on the order of as little as one micron on a side. Here it will be understood that real images formed by arrays of light emitting devices on semiconductor chips will be too small to easily perceive by a human eye. Even though the real image formed can have as many pixels as high definition television and can actually have as high or higher definition, each pixel can be as small as a few microns to less than one micron on each side (or in diameter). Thus, details of the real image can not be seen, or perceived. As the semiconductor technology improves and increases, the size of each semiconductor device becomes smaller (less than a micron across) and the overall size of semiconductor chips increases (as much as an inch along at least one of the sides presently). However, the processing complexity and yield of such extremely large semiconductor chips suffers with the size increase.

Figure 3:
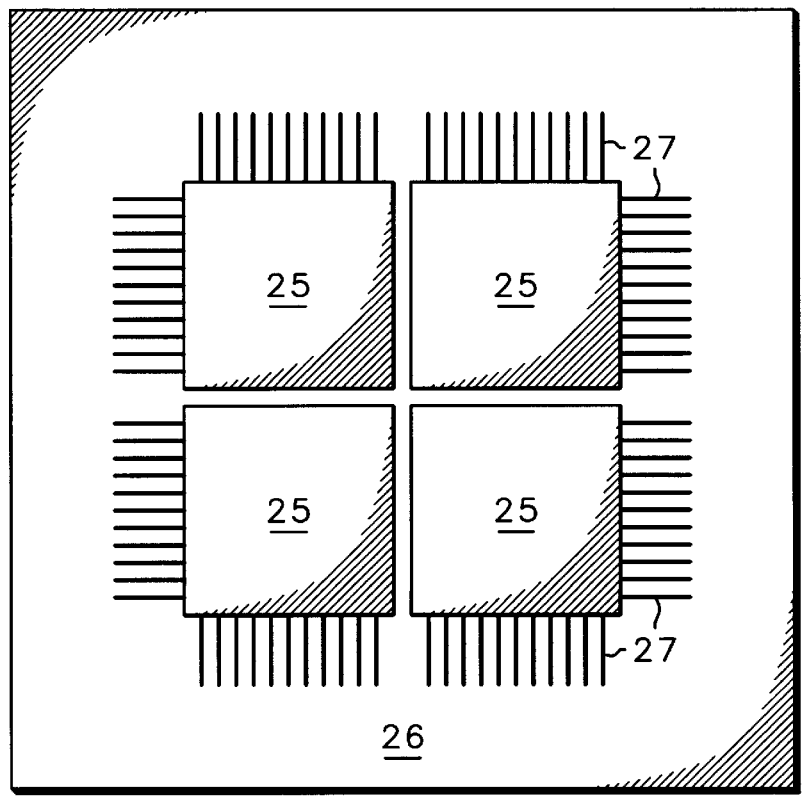
FIG. 3 is a view in top plan of a plurality of semiconductor chips, having light emitting device arrays formed thereon, mechanically combined to form a large single array.

Referring to FIG. 3, a plurality of semiconductor chips 25, in this specific example four, are mounted on a single substrate 26. Substrate 26 can be, for example, a glass or semiconductor substrate, a printed circuit board, or other substrate on which semiconductor chips 25 can be mounted. In fact, the arrays of light emitting devices on semiconductor chips 25 can be formed with the contacts on the lower surfaces thereof and direct contact can then be made to connecting and, possibly, driving circuitry formed on substrate 26 (in this specific case a larger semiconductor chip). Each of the semiconductor chips 25 contains an array of light emitting devices, similar to array 15 on semiconductor chip 20. However, each of the four semiconductor chips 25 are bonded to substrate 26 to form a single complete array four times as large as a single semiconductor chip 25. By combining the arrays formed on smaller, higher yield semiconductor chips 25 into a single larger array, the cost per pixel is lowered and higher pixel counts can be relatively easily achieved.

Generally, if each semiconductor chip 25 is connected externally along the sides by leads 27, as is common in semiconductor chips, the leads 27 (or other external contact or bonding pads) will have to be positioned along at least two sides or edges in order to provide a sufficient contacts for addressing each pixel in the array. This actually limits the largest number of semiconductor chips 25 that can be mechanically combined into a single common or complete array to four. As described above, however, if different contacts are utilized, such as bump bonding on the reverse side, greater numbers of semiconductor chips can be combined mechanically into a single array.

Figure 4:
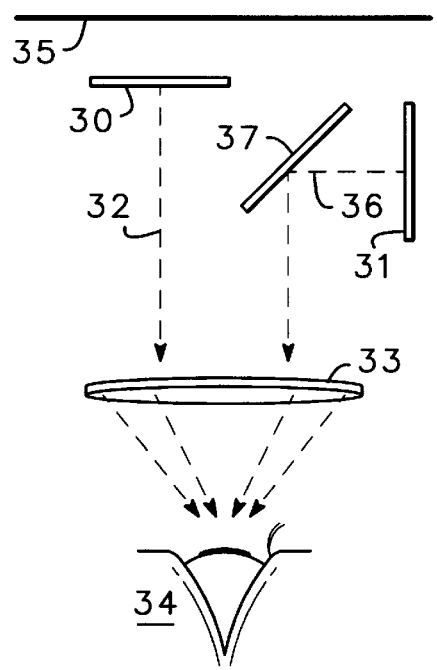
FIG. 4 is a schematic illustration of an image combining structure, for optically combining real images and providing a magnified virtual image.

Optically combining the outputs of a plurality of semiconductor chips is performed, for example, as illustrated schematically in FIG. 4. In this embodiment, two semiconductor chips 30 and 31 each include an array of pixels, with each pixel including at least one light emitting device, as described above with relation to FIG. 2. Semiconductor chip 30 is positioned so that light emanating therefrom (represented by broken line 32) is magnified by an optical system 33. Here optical system 33 is represented by a single lens but it should be understood that a variety of optical magnifying systems can be utilized, some of which will be explained in more detail presently. The array of pixels on semiconductor chip 30 forms one-half of a complete real image and the light passing through optical system 33 forms one half of a greatly enlarged virtual image 35. To an eye, represented at 34, virtual image 35 appears to be at a predetermined distance (determined by optical system 33) behind the entire structure. Virtual image 35, as seen from a viewing aperture (not shown) in the apparatus of FIG. 4 is illustrated in FIG. 5.

Semiconductor chip 31 is positioned so that light emanating therefrom (represented by broken line 36) is reflected from a mirror 37 through optical system 33 and forms a second half of virtual image 35. It should be noted that the two halves of virtual image 35 are combined so that no gap or overlap therebetween can be noticed by an operator. This is accomplished relatively easily, since all of the components are fixed and there is no need to vibrate the mirror or other components to expand the real image.

In another embodiment illustrated in FIG. 6, a pair of semiconductor chips 40 and 41 each include an array of pixels, with each pixel including at least one light emitting device, as described above with relation to FIG. 2. Semiconductor chip 40 is positioned so that light emanating therefrom (represented by broken line 42) passes directly through an optical element 45 which is partially transmissive and partially reflective. Optical element 45 could be any of a mirror, a hologram, a diffractive optical element, etc. for example. Light passing through optical element 45 is directed through an optical system 46, which is represented by a single magnifying lens. Semiconductor chip 41 is positioned so that light emanating therefrom (represented by broken line 43) is reflected from optical element 45 through optical system 46 to combine with light from semiconductor chip 40 and produce a complete virtual image 47. To an eye, represented at 44, virtual image 47 appears to be at a predetermined distance (determined by optical system 46) behind the entire structure. Here semiconductor chip 41 is offset vertically and/or horizontally one-half pixel pitch so that the pixels from semiconductor chip 41 are interleaved with pixels from semiconductor chip 40, as illustrated in FIG. 7. The arrays on semiconductor chips 40 and 41 can be formed with greater space between pixels and, thus, tolerances and manufacturing difficulty are greatly relieved. Instead of providing greater space between pixels on the semiconductor chips, optical system 46 can be formed to increase the magnification, and size of the virtual image, without reducing the clarity and detail of the virtual image. Also, this embodiment can be utilized to superimpose two real images (or more) of different colors to provide a virtual image in color.

In another embodiment illustrated in FIG. 8, all of the components are similar to the components illustrated in FIG. 6 and are designated with similar numbers having a prime added to indicate the different embodiment. Here mirrors 40' and 41' are not offset, so that the real images are superimposed directly. This embodiment is specifically utilized to produce a complete virtual image 47' in color with the real images generated by the device arrays on semiconductor chips 40' and 41' being generated in different colors. For example, semiconductor chip 40' generates a red real image and semiconductor chip 41' generates a green real image.

Figure 9:
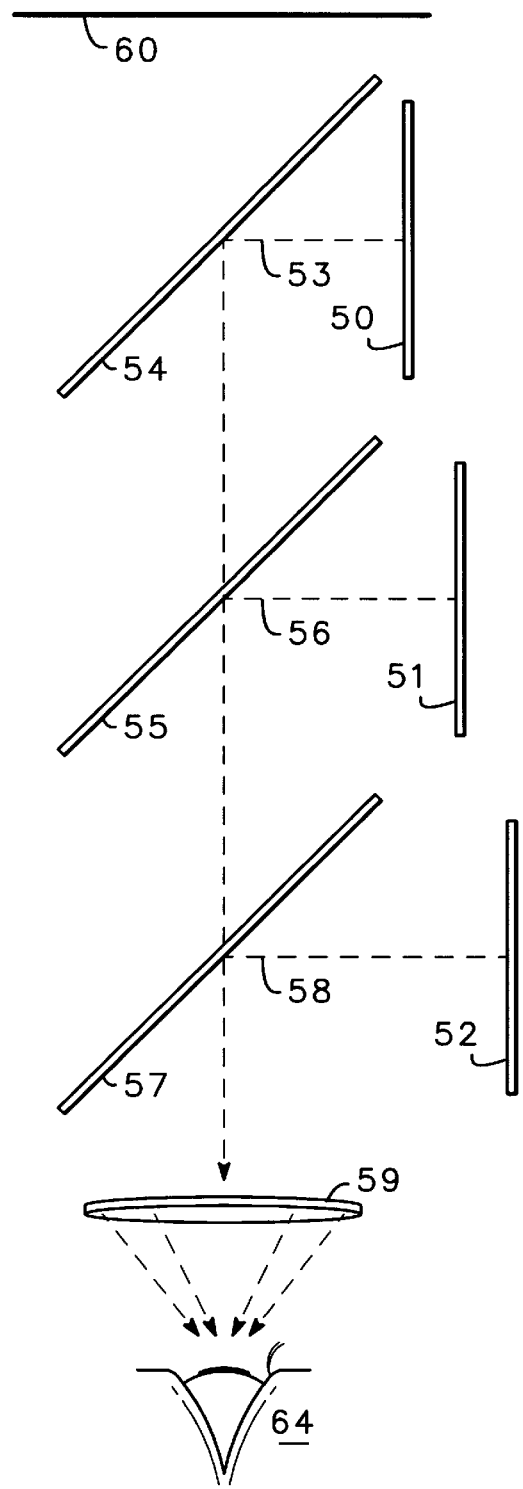
FIG. 9 is a schematic illustration of another image combining structure, for optically combining real images and providing a magnified virtual image.

In an embodiment illustrated in FIG. 9, three semiconductor chips 50, 51 and 52 each include an array of pixels, with each pixel including at least one light emitting device, as described above with relation to FIG. 2. In this embodiment the arrays of pixels on each of the semiconductor chips include light emitting devices which emanate light in different colors. For example, semiconductor chip 50 includes LEDs constructed to emit red light, semiconductor chip 51 contains LEDs constructed to emit green light, and semiconductor chip 52 contains LEDs constructed to emit blue light. LEDs which emit light of these colors, and others, such as yellow, are known in the art.

Semiconductor chip 50 is positioned so that red light emanating therefrom (represented by broken line 53) is reflected from an optical element 54, such as a mirror or diffractive optical element, onto a rear surface of a second optical element 55. Semiconductor chip 51 is positioned so that green light emanating therefrom (represented by broken line 56) is directed onto a front surface of optical element 55. Optical element 55 is constructed to pass red light reflected by optical element 54 directly therethrough and to reflect green from semiconductor chip 51, with the combined transmitted and reflected light being directed onto a rear surface of a third optical element 57. Semiconductor chip 52 is positioned so that blue light emanating therefrom (represented by broken line 58) is directed onto a front surface of optical element 57. Optical element 57 is constructed to pass the combined red and green light from optical element 55 directly therethrough and to reflect blue from semiconductor chip 52, with the combined transmitted and reflected light being directed through an optical system 59. A complete virtual image 60 in color is visible through a viewing aperture (not shown). To an eye, represented at 64, virtual image 60 appears to be at a predetermined distance (determined by optical system 59) behind the entire structure. In this embodiment optical element 55 is a dichroic mirror specifically designed to transmit light at red wavelengths and to reflect light at green wavelengths. Optical element 57 is specifically designed to transmit light at red to green wavelengths and to reflect light at blue wavelengths.

Figure 10:
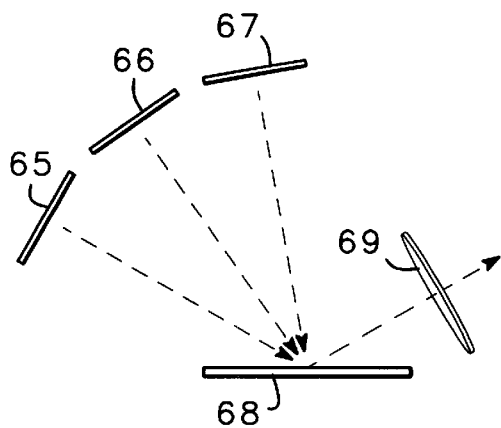
FIG. 10 is a schematic illustration of another image combining structure, for optically combining real images and providing a magnified virtual image.

In an embodiment illustrated in FIG. 10, three semiconductor chips 65, 66 and 67 each include an array of pixels, with each pixel including at least one light emitting device, as described above with relation to FIG. 2. In this embodiment the arrays of pixels on each of the semiconductor chips include light emitting devices which emanate light in different colors. For example, semiconductor chip 65 includes LEDs constructed to emit red light, semiconductor chip 66 contains LEDs constructed to emit green light, and semiconductor chip 67 contains LEDs constructed to emit yellow light. A single optical element 68 is positioned to receive light emanating from each of the semiconductor chips 65, 66 and 67, combine the different colored light into a single complete image in color and to reflect the single complete image in color through an optical system 69 which provides a magnified complete virtual image in color that can be perceived by a human eye.

Figure 11:
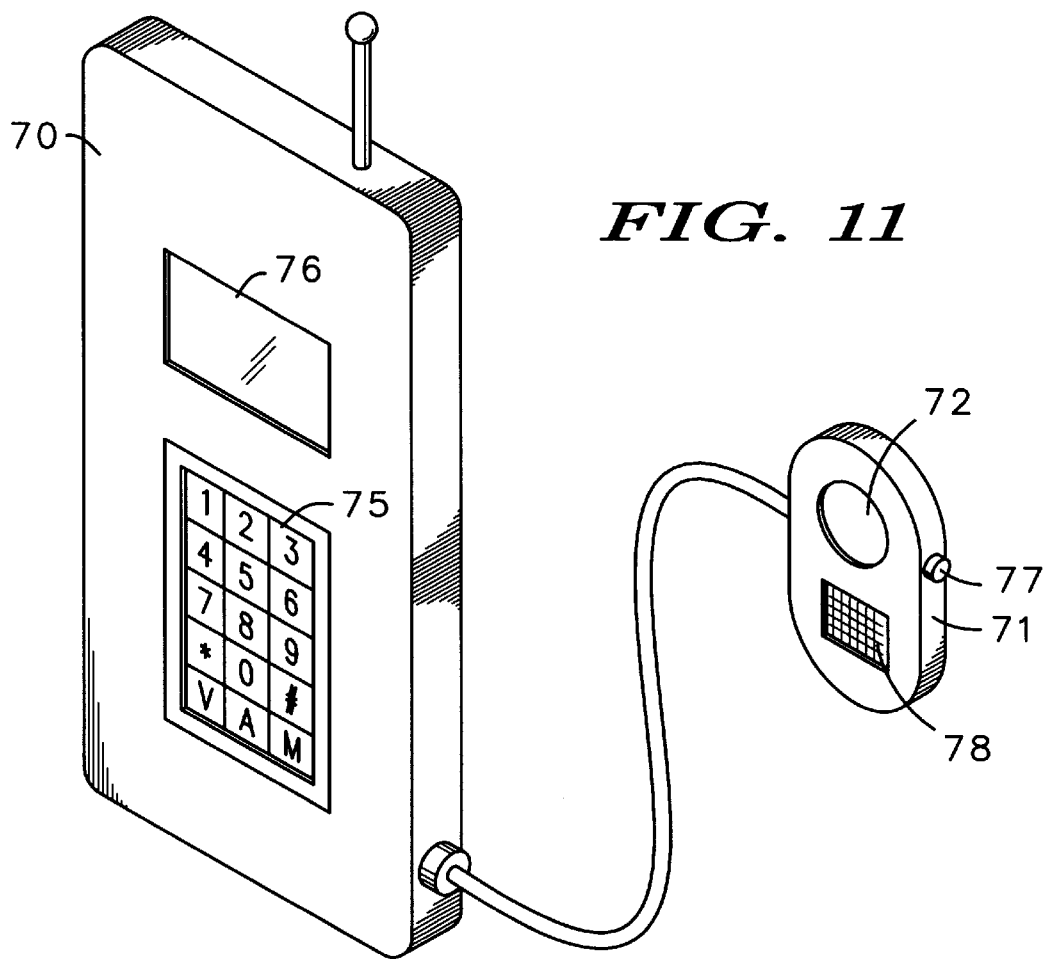
FIG. 11 is a view in perspective of a portable communications receiver embodying the present invention.

FIG. 11, illustrates a portable communications receiver 70 having a hand held microphone 71 with a miniature virtual display 72 mounted therein. It will of course be understood that portable communications receiver 70 can be any of the well known portable receivers, such as a cellular or cordless telephone, a two-way radio, a pager, etc. In the present embodiment, for purposes of explanation only, portable communications receiver 70 is a portable two-way police radio, generally the type carried by police officers on duty or security guards. Portable communications receiver 70 includes a control panel 75 for initiating calls and a standard visual display 76, if desired, for indicating the number called or the number calling. Alternately, 76 includes a speaker in addition to or instead of the visual display. Hand held microphone 71 has a push-to-talk switch 77 and a voice pick-up 78.

Figure 12:
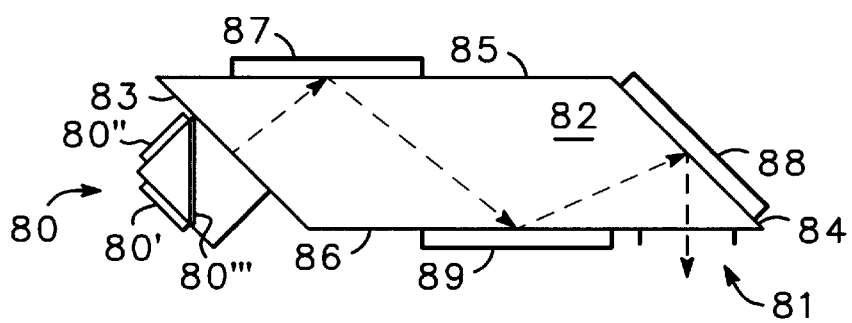
FIG. 12 is a simplified schematic view of a miniature virtual image display included in the portable communications receiver of FIG. 11.

A specific example of miniature virtual display 72 is illustrated schematically in FIG. 12. Display 72 includes image generation apparatus 80 for providing a real image to a fixed optical system, which in turn produces a virtual image viewable by the operator through an aperture 81. The fixed optical system is constructed to magnify the entire real image from image generation apparatus 80, without utilizing moving parts, so that the virtual image viewable through aperture 81 is a complete frame, or picture, which appears to be very large and is easily perceived or discernable by the operator. By producing a virtual image from the very small real image of image generation apparatus 80, the fixed optical system is relatively small and adds virtually no additional space requirements to hand held microphone 71. The optical system is constructed with no moving parts, other than optional features such as focusing, zoom lenses, etc. Further, image generating apparatus 80 requires very little electrical power to generate the complete real image and, therefore, adds very little to the power requirements of portable communications receiver 70.

Referring specifically to FIG. 12, miniature virtual image display 72 is a waveguide virtual image display in which image generation apparatus 80 is affixed to an inlet of an optical waveguide 82 for providing a real image thereto. Image generation apparatus 80 can be, for example, a generator similar to those illustrated schematically in FIGS. 6 or 7. In generation apparatus 80 a semiconductor device array 80' is positioned on one surface, a second semiconductor device array is positioned perpendicular to array 80' and an optical element 80''' is mounted to combine the two images as previously described. Waveguide 82 is formed generally in the shape of a parallelogram (side view) with opposite sides, 83, 84 and 85, 86, equal and parallel but not perpendicular to adjacent sides. Side 83 defines the inlet and directs light rays from the real image at apparatus 80 onto a predetermined area on adjacent side 85 generally along an optical path defined by all four sides. Three diffractive lenses 87, 88 and 89 are positioned along adjacent sides 85, 84 and 86, respectively, at three predetermined areas and the magnified virtual image is viewable at aperture 81 in side 86. This particular embodiment illustrates a display in which the overall size is reduced somewhat and the amount of material in the waveguide is reduced to reduce weight and material utilized.

Figure 13:
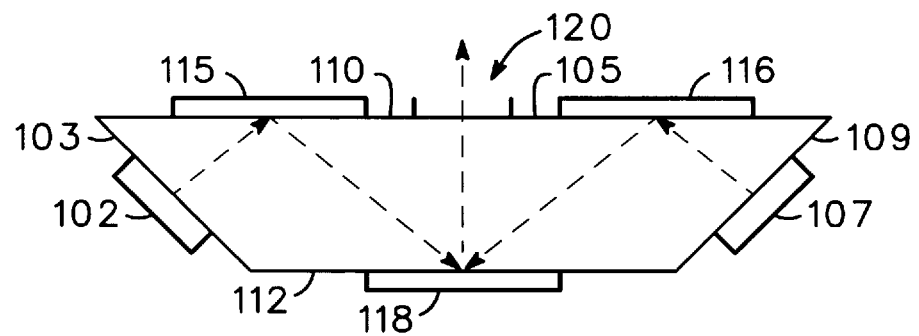
FIGS. 13 is a simplified schematic view, similar to FIG. 12, of another miniature virtual image display usable in the portable communications receiver of FIG. 11.

Referring specifically to FIG. 13, another embodiment of a miniature virtual image display 100 incorporated into a waveguide virtual image display is illustrated schematically. Display 100 includes image generation apparatus 102 affixed to an inlet side 103 of an optical waveguide 105 for providing a first real image thereto. Second image generation apparatus 107 is affixed to a second inlet side 107 of optical waveguide 105 for providing a second real image thereto. Image generation apparatus 102 and 107 can be, for example, a generator similar to those illustrated schematically in FIGS. 6 or 7 and constructed as explained with relation to FIG. 12.

Waveguide 105 is formed generally in the shape of a truncated triangle (or approximately one-half of the parallelogram waveguide of FIG. 12 with a mirror image added). Waveguide 105 includes inlet sides 102 and 107 at opposite ends thereof and joined by parallel sides 110 and 112. Side 103 defines one inlet and directs light rays from the real image at apparatus 102 onto a diffractive lens 115 positioned on adjacent side 110. Side 109 defines the second inlet and directs light rays from the real image at apparatus 107 onto a diffractive lens 116 positioned on adjacent side 110. A third diffractive lenses 118 is positioned on adjacent side 112 and combines the images received from diffractive elements 115 and 116. The combined image is then directed through an aperture 120 where the magnified virtual image is viewable and fully perceivable.

It should be understood that miniature virtual image display 100 could be utilized in a variety of potential embodiments. For example, image generating apparatus 102 and 107 could each provide two complete images in different colors (as described relative to FIG. 8) to provide a complete image in color at aperture 120 which is composed of four different basic colors. In another embodiment, image generating apparatus 102 and 107 could each provide one-half of the complete image in a side-by-side relationship by simply adjusting the positions thereof. In a still further embodiment, image generating apparatus 102 and 107 could each provide one-half of the complete image and, by simply adjusting the positions of the images one-half pixel, could be interleaved (as described in relation to FIG. 6). These potential embodiments are given only as examples and it will be understood by those skilled in the art that other combinations and modifications of the disclosed embodiments are possible to provide a great variety of miniature virtual image displays.

Figure 14:
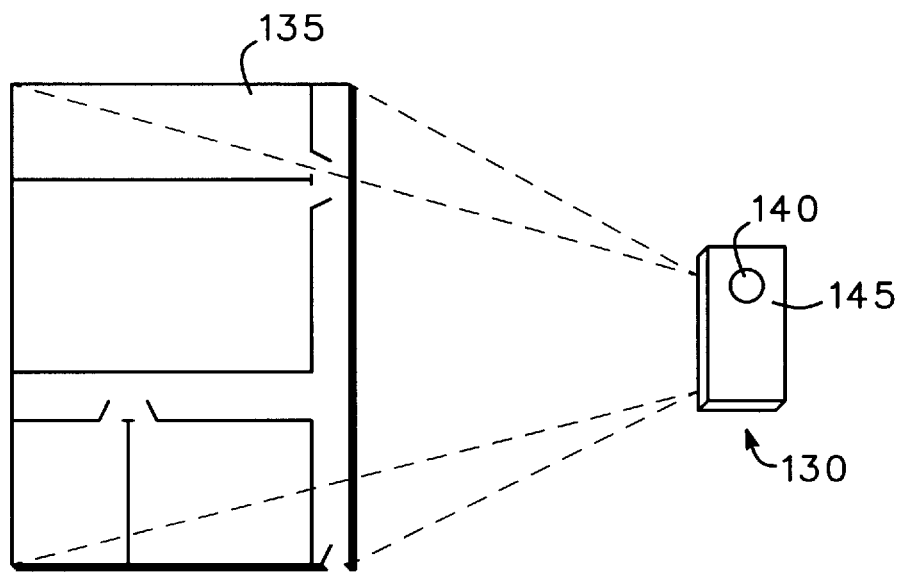
FIG. 14 is a view in perspective illustrating a typical view as seen by the operator of the portable communications receiver of FIG. 11.

FIG. 14 is a perspective view of hand held microphone or pager 130 illustrating a typical view 135 seen by an operator looking into viewing aperture 140 of miniature virtual image display 145. View 135 could be, for example, a floor plan of a building about to be entered by the operator (a policeman). The floor plan is on file at the police station and, when assistance is requested by the policeman, the station simply transmits the previously recorded plan. Similarly, miniature virtual image display 145 might be utilized to transmit pictures of missing persons or wanted criminals, maps, extremely long messages, etc. Many other variations, such as silent receiver operation wherein the message appears on display 145 instead of audibly, are possible. Because the images can be transmitted in full color, they are much more pleasing to the eye and a much larger content of information is possible.

Accordingly, a new and improved miniature virtual image color display is disclosed which is easily incorporated into portable communication receivers and other electronic devices and which display requires substantially less space to provide a useful and easily viewable display. Further, the new and improved miniature virtual image color display or use with portable communication receivers and the like substantially reduces the amount of power required and is substantially insensitive to shock while being extremely versatile. Also disclosed is a new and improved method of combining multi-colored images to produce a miniature virtual color image easily adapted for use in portable communication receivers and the like. Also, the new and improved miniature virtual image display, whether providing a colored or black and white virtual image, is relatively inexpensive and simple to manufacture.

While I have shown and described specific embodiments of the present invention, further modifications and improvements will occur to those skilled in the art. I desire it to be understood, therefore, that this invention is not limited to the particular forms shown and I intend in the appended claims to cover all modifications that do not depart from the spirit and scope of this invention.

What is claimed is:

1. Portable electronic apparatus including a miniature virtual image color display comprising:

a portable electronic device with a video data output; and a miniature virtual image display physically incorporated into the portable electronic device and including a viewing aperture, a plurality of image generating structures each including a data input terminal electrically connected to the portable electronic device and a plurality of light emitting devices defining a plurality of pixels assembled in a two dimensional array and each image generating structure forming a different color two dimensional real image in response to data signals received from the portable electronic device, the real images being too small to be easily perceived by a human eye, fixed optical combining means for integrating the different color two dimensional real images into a preferred color, single complete real image, the fixed optical combining means including an optical waveguide having a plurality of relatively flat surfaces with each of the plurality of image generating structures being mounted on different ones of the relatively flat surfaces, the fixed optical combining means further including a plurality of elements positioned on other of the relatively flat surfaces of the optical waveguide to direct and reflect the different color two dimensional complete real images from the plurality of image generating structures into a single preferred color image, and optical magnifying means for producing, from the single preferred color image, a virtual preferred color image, which virtual image is magnified so as to be viewable and easily perceived through the viewing aperture.

2. Portable electronic apparatus including a miniature virtual image color display as claimed in claim 1 wherein the plurality of elements included in the fixed optical combining means include at least some diffractive optical elements.

3. Portable electronic apparatus including a miniature virtual image color display as claimed in claim 1 wherein the optical magnifying means is at least partially incorporated into the optical waveguide and the plurality of elements.

4. Portable electronic apparatus including a miniature virtual image display as claimed in claim 1 wherein the portable electronic device includes one of a pager, a cellular phone, or a handheld computer.

5. Portable electronic apparatus including a miniature virtual image display as claimed in claim 1 wherein each of the light emitting devices include one of organic light emitting diodes, semiconductor lasers, or field emission devices.

6. Portable electronic apparatus including a miniature virtual image display comprising:

a portable electronic device with a video data output; and a miniature virtual image display physically incorporated into the portable electronic device, the miniature virtual image display including a plurality of image generating structures with each image generating structure including a data input terminal electrically connected to the portable electronic device and a plurality of light emitting devices defining a plurality of pixels assembled in a two dimensional array and forming a different two dimensional portion of a complete real image in response to data signals received from the portable electronic device, the plurality of pixels on each image generating structure being at least one quarter of the total pixels in the complete real image and the complete real image being too small to be easily perceived by a human eye, fixed optical combining means for integrating the different two dimensional portions into a complete and continuous real image, the fixed optical combining means including a fixed optical reflecting surface mounted to optically position one of the different two dimensional portions in a side-by-side abutting position next to another of the different two dimensional portions to form a continuous real image, and optical magnifying means for producing, from the complete and continuous real image, a virtual image of the complete and continuous real image, which virtual image is magnified so as to be viewable and easily perceived through the viewing aperture.

7. Portable electronic apparatus including a miniature virtual image display as claimed in claim 6 wherein the portable electronic device includes one of a pager, a cellular phone, or a handheld computer.

8. Portable electronic apparatus including a miniature virtual image display as claimed in claim 6 wherein each of the light emitting devices include one of organic light emitting diodes, semiconductor lasers, or field emission devices.

9. Portable electronic apparatus including a miniature virtual image display as claimed in claim 6 wherein the fixed optical combining means for integrating the different two dimensional portions into a complete and continuous real image includes an optical waveguide for mounting the fixed optical reflecting surface.

10. Portable electronic apparatus including a miniature virtual image display comprising:

a portable electronic device with a video data output; and a miniature virtual image display physically incorporated into the portable electronic device, the miniature virtual image display including a plurality of image generating structures with each image generating structure including a data input terminal electrically connected to the portable electronic device and a plurality of light emitting devices defining a plurality of pixels assembled in a two dimensional array and forming a different two dimensional portion of a complete real image in response to data signals received from the portable electronic device, the plurality of pixels on each image generating structure being at least one quarter of the total pixels in the complete real image and the complete real image being too small to be easily perceived by a human eye, fixed optical combining means for integrating the different two dimensional portions into a complete and continuous real image, the fixed optical combining means including a partially reflective, partially transmissive mirror fixedly mounted with a first surface positioned to receive a first different two dimensional portion from a first of the plurality of image generating structures for reflection thereof and a second surface positioned to receive a second different two dimensional portion from a second of the plurality of image generating structures for transmission thereof through the mirror, the reflected and transmitted first and second different two dimensional portions being positioned so that lines of pixels are interleaved alternately from the first different two dimensional portion and the second different two dimensional portion to form a complete real image, and a lens system mounted adjacent the mirror to receive the complete real image from the mirror and to magnify the received complete real image and produce a single virtual image in the viewing aperture, and optical magnifying means for producing, from the complete and continuous real image, a virtual image of the complete and continuous real image, which virtual image is magnified so as to be viewable and easily perceived through the viewing aperture.

11. Portable electronic apparatus including a miniature virtual image display as claimed in claim 10 wherein the fixed optical combining means for integrating the different two dimensional portions into a complete and continuous real image includes an optical waveguide for mounting the partially reflective, partially transmissive mirror and for transmitting the first and second different two dimensional portions.

* * * * *